United States Patent [19]

Asakuno et al.

[11] Patent Number: 4,638,030

[45] Date of Patent: Jan. 20, 1987

[54] POLYPROPYLENE INTERIOR PARTS FOR AUTOCARS

[75] Inventors: Hiroyoshi Asakuno, Ichihara; Kinya Mori, Chiba; Kiyoaki Suzuki, Ichihara; Mamoru Nishida, Chiba; Kenji Iwai, Ichihara; Masahiro Tamamushi; Teruo Kawasaki, both of Yokohama, all of Japan

[73] Assignees: Chisso Corporation, Osaka; Nissan Motor Co. Ltd., Kanagawaken, both of Japan

[21] Appl. No.: 748,438

[22] Filed: Jun. 25, 1985

[30] Foreign Application Priority Data

Jul. 9, 1984 [JP] Japan .................. 59-141844

[51] Int. Cl.$^4$ ................. C08L 23/16; C08L 53/00
[52] U.S. Cl. .................................. 524/536; 525/323
[58] Field of Search ............... 428/223, 131; 525/319, 525/247, 323, 324; 524/536

[56] References Cited

U.S. PATENT DOCUMENTS 4,500,734 12/1985 Fujishita et al. .................. 526/351

FOREIGN PATENT DOCUMENTS 0094818 11/1983 European Pat. Off. .

*Primary Examiner*—Allan M. Lieberman
*Attorney, Agent, or Firm*—Fred Philpitt

[57] ABSTRACT

Polypropylene interior parts for autocars having overcome the drawback of their permanent bulge or secondary deformation due to high temperature exposure is provided, which parts are obtained by molding a material comprising a propylene-ethylene block copolymer prepared by polymerizing propylene at a first stage so that the resulting propylene homopolymer can have a relation between its isotactic pentad ratio (P) and MFR of $$1.00 \geq P \geq 0.015 \log MFR + 0.955$$

and can occupy 70 to 95% by weight of the total polymerization quantity, followed by polymerizing ethylene or ethylene and propylene in 30 to 5% by weight of the total polymerization quantity at at least one stage, so as to give an ethylene content occupying 3 to 12% by weight of the total polymerization quantity.

2 Claims, 9 Drawing Figures 1b-1    1b-2

1b-3    1b-4

1c-1

1c-2

1c-3

POLYPROPYLENE INTERIOR PARTS FOR AUTOCARS

BACKGROUND OF THE INVENTION

1. Field of the Invention

This invention relates to polypropylene interior parts for autocars. More particularly it relates to polypropylene interior parts obtained by molding a propylene-ethylene block copolymer having an ethylene content of 3 to 12% by weight and a propylene homopolymer part occupying 70 to 95% by weight of the total polymerization quantity, the isotactic pentad fraction and MFR of this homopolymer part having therebetween a relationship of $1.00 \geq P \geq 0.015 \log \text{MFR} + 0.955$.

2. Description of the Prior Art

As to the materials for interior parts for autocars, plastics have recently been more and more used particularly from the viewpoint of making autocars lightweight or saving their fuel cost. Further, as to the kind of plastics used, polyolefin resins, particularly polypropylene resins have been perferably used since these resins are superior in moldability, economy, appearance, strength, weathering resistance and durability of molded products.

As the materials for interior parts occupying a main position among parts for autocars, thermoplastic resins such as vinyl chloride resin, ABS resin, PS resin, modified PPO resin and polyacetal resin have so far been used, but since polypropylene resin is superior in moldability and other properties mentioned above it is notably advantageous in the reference to mass-productivity.

However, it has been found by research of the present inventors that interior parts for autocars (hereinafter abbreviated to interior parts) molded using so far generally known polypropylene resin (hereinafter abbreviated to polypropylene) have the following fatal problem: interior parts molded using polypropylene have a latent residual stress due to internal strain generated during the cooling process after molding; hence when the parts are fixed to the inside of the passenger compartment of autocars and then exposed to a high temperature of 70° to 120° C., the above internal strain is released to bring about a secondary deformation of the parts.

Interior parts are generally fixed at a number of points. In the case of plastic interior parts, due to a linear expansion behavior caused by the above high temperature exposure, a bulge amounting to 5 to 20 mm is formed between the fixed points. As to this bulge, due to a linear shrinkage behavior caused when the temperature inside the passenger compartment of autocars decreases from a high temperature down to room temperature or lower, it is possible to recover the original shape at the initial period when the number of times of the expansion shrinkage is small. However, when the expansion and shrinkage are repeated many times, a creep phenomenon occurs to make it impossible to recover the original shape and a "permanent bulge" occurs. When interior parts are fixed to the inside of the passenger compartment of autocars, the permanent bulge makes inferior the "fitting" of the interior parts to adjacent parts i.e. the physically adjoining state. In the case of polypropylene interior parts, too, it has been found that a serious problem of the above permanent bulge has been raised.

The present inventors have made extensive research in order to solve the above problems relative to the polypropylene interior parts, and as a result, have found that the above drawback of "permanent bulge" or "secondary deformation" can be overcome in the case of interior parts using a specified highly crystalline propylene-ethylene block copolymer in place of conventional polypropylene, particularly in the case of interior parts wherein the cross section perpendicular to the axial direction of the parts has a percentage opening of 20 to 48% (this percentage opening will be defined later)*.

As is apparent from the foregoing, an object of the present invention is to provide polypropylene interior parts for autocars having overcome the drawback of their permanent bulge or secondary deformation due to high temperature exposure. Another object of the present invention is to provide such interior parts having a suitable quantity of fillers blended therein.

SUMMARY OF THE INVENTION

The present invention has the following main constitution (1) and constitutions (2) and (3) as embodiments:

(1) Polypropylene interior parts for autocars, obtained by molding a material comprising a propylene-ethylene block copolymer prepared by polymerizing propylene at a first stage so that the resulting propylene homopolymer can have a relation between its isotactic pentad ratio (P) and MFR of $$1.00 \geq P \geq 0.015 \log \text{MFR} + 0.955$$

and can occupy 70 to 95% by weight of the total polymerization quantity, followed by polmerizing ethylene or ethylene and propylene in an amount of 30 to 5% by weight of the total polymerization quantity at at least one stage, so as to give an ethylene content occupying 3 to 12% by weight of the total polymerization quantity. (2) Polypropylene interior parts for autocars according to the above item (1) wherein said material to be molded is a composition of said propylene-ethylene block copolymer having 5 to 30% by weight of a filler blended therein. (3) Polypropylene interior parts for autocars according to the above item (1) or (2), having a percentage opening of the cross section perpendicular to the direction of the major axis thereof of 20 to 48%; two or more fixed points at a fixing pitch of 300 mm or less; and a geometrical moment of inertia in the cross section at the central part between the fixed points, of 50 mm$^4$ or more.

DESCRIPTION OF THE DRAWINGS

FIG. 1a shows its front view and FIGS. 1b (1b-1, 1b-2, 1b-3 and 1b-4) each show the cross section perpendicular to its major axis and FIGS. 1c (1c-1, 1c-2 and 1c-3) each show the cross section illustrating a fixing manner thereof.

FIG. 2 shows the cross section perpendicular to its major axis.

DETAILED DESCRIPTION OF THE PREFERRED EMBODIMENTS

Figure 1A:
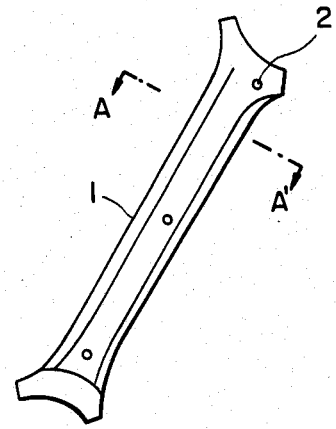
FIG. 1a, FIGS. 1b and FIG. 2 each show a pillar garnish as an example of the interior parts for autocars of the present invention.
Figure 1B:
Figure 1B:
Figure 1B:
Figure 1B:

The constitution and effectiveness of the present invention will be described below in more detail.

In the production of the interior parts of the present invention, a propylene-ethylene block copolymer having a specified composition and specified physical properties is used.

Conventional propylene-ethylene block copolymers have been produced according to a polymerization process comprising polymerization steps at two or more stages having a production step for the propylene homopolymer part and for the entylene homopolymer part or the ethylenepropylene copolymer part, and are superior in high-impact properties to propylene homopolymer, but on the other hand, have a drawback as their heat-softening points are somewhat lower than that of the homopolymer.

Whereas the copolymer used in the present invention is a certain kind of high-rigidity polypropylene wherein the propylene homopolymer part occupying 70 to 95% by weight of the total copolymer satisfies a relation between its isotactic pentad fraction (P) and MFR of $$1.00 \geq P \geq 0.015 \log MFR + 0.955,$$

and the ethylene content in the ethylene homopolymer part or the ethylene-propylene copolymer part of the block copolymer is limited to 3 to 12% by weight based on the total quantity of the copolymer.

Such a copolymer and its production process are disclosed in e.g. Japanese patent application No. Sho 57-84446/1982 (Japanese patent application laid-open No. Sho 58-201816/1983) corresponding to U.S. Pat. No. 4,550,144. The copolymer disclosed therein and usable in the present invention is superoir in various strengths and heat deformation temperature (HDT) to so far known propylene homopolymer or propylene-ethylene block copolymers. This is evident from the following Table 1:

assist under cover, defroster nozzle, seat side cover, door trim, ect.

Among these examples, pillar garnish as representative parts will be described referring to FIGS. 1$a$, 1$b$ and 1$c$.

FIG. 1$a$ shows an appearance of a pillar garnish wherein numeral 1 represents its body; 2, a hole through which it is fixed; and its total length is about 500 to 1,000 mm.

FIGS. 1$b$ each show a cross section perpendicular to the direction of the major axis of the pillar garnish of FIG. 1$a$, and the shapes of the cross section along the line A—A' as shown in FIGS. 1$b$-1, 1$b$-2, 1$b$-3 and 1$b$-4 are somewhat closed as compared with that of the cross section of plate, depending on the manners of design.

In the present invention, the extent to which the shapes are closed is expressed in terms of the percentage opening in the cross section. For example, in the case of a structure having no opening part as in the cross section of cylinder, the percentage opening is 0%, while in the case of a structure having a circle cut into halves, the percentage opening is a value obtained by dividing the length of a segment connecting both the opening ends ($2r$, where $r$ is the radius) by the total periphery. Thus $$2r + \pi r = 5.14\, r, \text{ that is, } (2r/5.14r) \times 100 = 38.9\%.$$

Thus, the percentage opening of a structure having a concave cross section is 50% or less.

Figure 2:
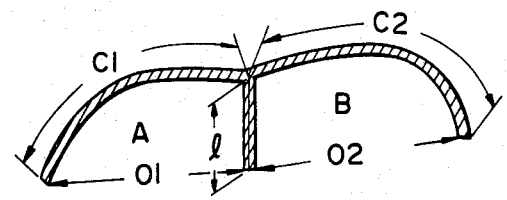
Figure 2:
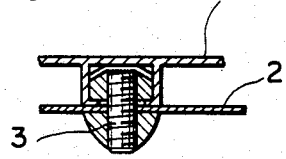

In the case of a structure as shown in FIG. 2 having, although it is concave, at least one rib at position (s)

TABLE 1

Polymerization results described in Japanese patent application laid-open No. Sho 58-201816/1983

| | | Example | | | Comparative example | | |
|---|---|---|---|---|---|---|---|
| | | 1 | 2 | 3 | 1 | 2 | 3 |
| Polymer at first stage | | | | | | | |
| MFR | g/10 min. | 11.5 | 19.0 | 26.0 | 11.0 | 12.2 | 18.5 |
| Isotactic pentad fraction | (P) | 0.982 | 0.979 | 0.985 | 0.934 | 0.938 | 0.941 |
| Yield of final polymer | Kg | 45.2 | 50.3 | 54.4 | 41.5 | 44.7 | 49.8 |
| MFR | g/10 min. | 8.5 | 9.0 | 7.7 | 11.0 | 8.8 | 8.1 |
| T $C_2=$ | %* | 4.2 | 8.5 | 12.1 | — | 4.5 | 8.3 |
| R $C_2=$ | %** | 62 | 60 | 62 | — | 61 | 62 |
| Bending modulus | $10^4$ Kg/cm$^2$ | 1.85 | 1.53 | 1.42 | 1.36 | 1.21 | 1.16 |
| Bending strength | Kg/cm$^2$ | 526 | 458 | 381 | 372 | 365 | 354 |
| Tensile strength | Kg/cm$^2$ | 397 | 384 | 353 | 346 | 337 | 305 |
| HDT | °C.*** | 129 | 115 | 106 | 105 | 103 | 100 |
| II | K$_1$ cm/cm$^2$**** | 5.6 | 8.4 | 12.8 | 3.2 | 5.7 | 8.1 |
| Hardness | R-scale | 112 | 105 | 101 | 104 | 96 | 91 |

Note:
*Ethylene content in total polymer (% by weight)
**Ethylene content in a part polymerized at second stage (% by weight)
***Heat deformation temperature
****Izod impact strength As described above, by using this resin for interior parts for autocars, the problem of "permanent bulge" or "secondary deformation" at the time of use of the parts has been overcome.

As for the process for producing the interior parts for autocars of the present invention, any of known injection molding process, extrusion molding process and others may be employed. Concrete molding conditions such as resin melting temperature, retention time inside the extruder, ect. are the same as those in the case of conventional polypropylene.

Concrete examples of the interior parts for autocars of the present invention are pillar garnish, quicking plate, instrument panel, console box, shell column cover, glove box, glove box lid, dash side finisher, instmidway between both the opening ends whereby the cross section is divided into two or more sections (A, B, - - - ), the same calculation as above is applied to the respective opening parts of sections A, B, - - - , and the average of the thus calculated values is regarded as the percentage opening of the structure.

Namely in FIG. 2, the following calculated value corresponds to the percentage opening:

Percentage
opening $= [01/(C1 + l + 01) + 02/(C2 + l + 02)] \div 2$

The value of the percentage opening directed to the cross-sectional shape of the parts of the present invention has no particular limitation, but in view of the requirement for shape intrinsic to the parts, for fixing the opening parts onto the body of autocars, the value of the percentage opening is practically in the range of 20 to 48%. In this range, it is possible to suppress particularly the above "permanent bulge" or "secondary deformation" within a practically tolerable range.

Figure 1C:
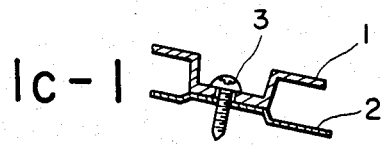
Figure 1C:
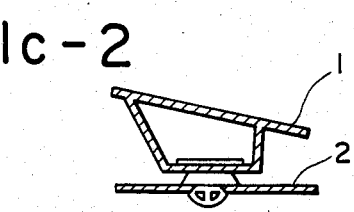

FIGS. 1c each show a cross-sectional view of the manner in which the product of the present invention is fixed onto the body of autocars.

In FIGS. 1c-1, 1c-2 and 1c-3, numeral 1 represents the product of the present invention; 2, the body of autocars; and 3, a connecting member (or a fixing means). Although the specific feature in shape of the product of the present invention is not particularly limited except for the value of the percentage opening, if the distance between a plurality of holes for fixing 2 in FIG. 1a, i.e. the fixing pitch is 300 mm or less, preferably in the range of 200 to 250 mm, the effectiveness of the product may be most exhibited. Namely, when the product of the present invention is fixed onto the body of autocars, if the fixing pitch is 300 mm or less, the geometrical moment of inertia of the product at the central part between two fixed points is 50 mm$^4$ or greater.

With the propylene-ethylene block copolymer to be used for the product of the present invention, an inorganic filler may be blended in an amount of 5 to 30% by weight based on the weight of the composition after blending.

The blending is carried out for filling, improvement in stiffness, improvement in high-impact properties, increase in bulk density, delustering, etc., as in the case of conventional polypropylene molded products. Thus, if the quantity thereof added is less than 5% by weight, the effectiveness is insufficient, while if it exceeds 30% by weight, the moldability and high-impact properties are somewhat reduced. As to the molded product, such properties as being injured or whitened as well as inferiority in appearance at the welded part improve.

To the copolymer used in the present invention, other additives in a small quantity may be added such as heat stabilizers, antioxidants, UV light absorbers, nucleus-creating agents, antistatic agents, pigments, etc.

Further, in the above case of blending inorganic fillers, in order to improve the integrity of the copolymer with fillers in the resulting molded product, a modified polyolefin resin obtained by grafting an unsaturated organic acid or its anhydride onto a polyolefin may be blended in a suitable quantity and this is preferred. Examples of such an unsaturated organic acid are maleic acid, acrylic acid, methacrylic acid, itaconic acid, etc. Among these, maleic acid or acrylic acid is preferred for the graft modification.

Effectiveness of the present invention:

The present invention has the constitutions described above in detail; hence even when the product is fixed onto the body of autocars, followed by subjecting it to a test of repeated exposure to a high temperature such as 100° to 120° C. inside the passenger compartment of autocars, (i) it is possible to inhibit the deformation quantity expressed in terms of "high temperature bulge", described later, down to within a tolerable range of 1 mm or less; (ii) it is possible to keep the resistance exhibited when the surface of the molded product is pressed, and expressed in terms of "high temperature firm feeling", described later, to a feasible value of 1.5 Kg or higher; and further (iii) the deformation quantity expressed in terms of "permanent deformation quantity after heat cycle (mm)", described later, is also notably smaller than those in the case of use of known other polypropylene resins. When an organic filler is blended in an amount of 30% by weight or less based on the weight of the composition after blending, with a polypropylene resin to be used, the blending effectiveness relative to the above measurement items is more improved. On the other hand, (iv) the evaluation of properties of being injured is somewhat reduced by the blending of the filler, but it is possible to still keep a practically sufficient evaluation value.

The present invention will be described below by way of Examples.

The evaluation methods of heat resistance test and others in Examples were carried out as follows:

(i) High temperature bulge:

This was expressed in terms of the maximum height (mm) of bulge at the central part in the fixing span of parts fixed onto the body of autocars at high temperatures (80°, 100° or 120° C.).

(ii) High temperature firm feeling:

This was measured in terms of the resistance (Kg/mm$^2$ at 80° C.) exhibited when the surface of parts fixed onto the body of autocars is pressed to impart a deformation of 2 mm thereto.

(iii) Permanent deformation quantity after heat cycle:

A permanent deformation quantity remaining at room temperature after parts fixed onto the body of autocars were subjected to 10 repetitions of a heat cycle of room temperature ⇌ high temperature (100° C.) was expressed in terms of a deformation quantity (mm) in the direction perpendicular to the axis corresponding to the fixing span.

(iv) Evaluation of properties of being injured:

This was carried out according to pencil hardness method (JIS K-5401).

EXAMPLES 1-9 AND COMPARATIVE EXAMPLES 1-10

Using propylene-ethylene block copolymer compositions each having a propylene-ethylene composition, an isotactic pentad fraction and a content of a filler (talc) each indicated in Table II shown later, quicking plates and upper pillar garnishes were prepared according to injection molding. These parts for autocars were fixed onto a definite jig and evaluated according to the above methods (i)–(iv). The constitutions and evaluation results of the above compositions and parts (quicking plates and upper pillar garnishes) are shown in Table II.

The evaluation standards are as follows:

(i) High temperature bulge:

Irrespective of the test temperatures, parts having a bulge less than 1.0 mm were regarded as o (pass) and those having a bulge of 1.0 mm or more, as x (rejection).

(ii) High temperature firm feeling:

Parts having a resistance of 1.5 Kg/mm$^2$ or more were regarded as o (pass) and those having a resistance less than 1.5 Kg/mm$^2$, as x (rejection).

(iii) Permanent deformation quantity after heat cycle:

Less than 0.5 mm: o (pass) and 0.5 mm or more: x (rejection).

(iv) Evaluation of properties of being injured-conspicuousness of injury:

When the surface of a molded product sample was scratched with a steel nail (tip end: 2R) having a load of 700 g at a rate of 1~2 cm/sec., the conspicuousness of the resulting injury was subjected to a relative evaluation.

The evaluation standards are as follows:

⊚: almost not conspicuous; not whitened.
o: somewhat conspicuous; somewhat whitened.
Δ: conspicuous; whitened.
x: very conspicuous; whitened.
xx: very conspicuous; notably whitened.
(v) Evaluation of properties of being injured:
A hardness value of B or more was regarded as passing.

Whereas the parts of Comparative examples were not those passing any of the four evaluation items except for a part of the items. Particularly as to the "permanent deformation quantity after heat cycle", none of the parts of the Comparative examples did not passed the test.

What we claim is:
1. Polypropylene interior parts for autocars, obtained by molding a material comprising a propylene-ethylene block copolymer prepared by

TABLE II

| | Examples and Comparative examples | | | | | | | | | |
|---|---|---|---|---|---|---|---|---|---|---|
| | Comparative example | | | | | | | | | |
| | 1 | 2 | 3 | 4 | 5 | 6 | 7 | 8 | 9 | 10 |
| (Composition) | | | | | | | | | | |
| (1) Isotactic pentad fraction of PP part | 0.931 | 0.931 | 0.931 | 0.980 | 0.945 | 0.931 | 0.980 | 0.980 | 0.980 | 0.931 |
| (2) Polymerization quantity of PP part | 81 | 81 | 81 | 81 | 81 | 81 | 81 | 81 | 81 | 81 |
| (3) Ethylene content in EP part | 8.2 | 8.2 | 8.2 | 8.5 | 8.0 | 8.2 | 8 | 8 | 8 | 8 |
| (4) Polymerization quantity of EP part | 19 | 19 | 17 | 19 | 17 | 19 | 19 | 19 | 19 | 19 |
| (5) Quantity of copolymer resin % | 100 | 85 | 70 | 70 | 65 | 60 | 100 | 80 | 100 | 80 |
| (6) Kind of filler | None | Talc | Talc | Talc | None | Talc | None | Talc | None | Talc |
| (7) Quantity of filler % (Parts) | 0 | 15 | 30 | 30 | 0 | 40 | 0 | 20 | 0 | 20 |
| (8) Name of parts | Quicking plate | → | → | → | → | Quicking plate | → | → | Upper pillar garnish | → |
| (9) Number of fixed points | 3 | → | → | → | → | 2 | → | → | → | → |
| (10) Fixing span (mm) | 240 | → | → | → | → | 244 | → | → | 420 | 272 |
| (11) Geometrical moment of inertia at central part of fixing mm$^4$ | 178 | → | → | → | → | 35 | → | → | 115 | 128 |
| (Evaluation) | | | | | | | | | | |
| (12) High temperature bulge (mm) | | | | | | | | | | |
| 80° C. | 0.4 | 0.4 | 0.4 | 0.2 | 0.4 | 5.1 | 10 | 8.5 | 0.2 | 0.2 |
| 100° C. | 7.2 | 1.9 | 0.4 | 0.2 | 0.8 | 6.2 | 12.5 | 11.1 | 0.2 | 0.4 |
| 120° C. | 7.5 | 3.2 | 0.6 | 0.2 | 6.5 | 7.2 | 15.3 | 11.8 | 4.2 | 2.8 |
| (13) High temperature firm feeling (Kg) 80° C. | 0.80 | 0.95 | 1.00 | 1.75 | 1.10 | 0.3 | 0.7 | 0.9 | 0.9 | 0.7 |
| (14) Permanent deformation quantity after heat cycle 80° C., 10 cycles (mm) | 2.5 | 2.5 | 0.9 | 0.2 | 0.7 | 2.8 | 3.4 | 3.2 | 1.8 | 1.0 |
| (15) Properties of being injured injury conspicuousness | ⊚ | Δ~x | xx | Δ~x | ⊚ | xx | ⊚ | o | ⊚ | Δ |
| (16) Pencil hardness | 4Bx | 4Bx | 4Bx | Bo | 3Bx | 4Bx | Bo | B$_o$~F | Bo | 4Bx |

| | Example | | | | | | | | |
|---|---|---|---|---|---|---|---|---|---|
| | 1 | 2 | 3 | 4 | 5 | 6 | 7 | 8 | 9 |
| (Composition) | | | | | | | | | |
| (1) Isotactic pentad fraction of PP part | 0.980 | 0.980 | 0.980 | 0.980 | 0.980 | 0.980 | 0.980 | 0.980 | 0.980 |
| (2) Polymerization quantity of PP part | 81 | 81 | 81 | 81 | 81 | 81 | 81 | 91.5 | 91.5 |
| (3) Ethylene content in EP part | 8 | 8 | 8 | 8 | 8 | 8 | 8 | 4.1 | 4.1 |
| (4) Polymerization quantity of EP part | 19 | 19 | 19 | 19 | 19 | 19 | 19 | 8.5 | 8.5 |
| (5) Quantity of copolymer resin % | 100 | 90 | 80 | 75 | 70 | 100 | 90 | 100 | 100 |
| (6) Kind of filler | None | Talc | Talc | Talc | Wollastonite | None | Wollastonite | None | Talc |
| (7) Quantity of filler % (Parts) | 0 | 10 | 20 | 25 | 30 | 0 | 10 | 0 | 20 |
| (8) Name of parts | Quicking plate | → | → | → | → | Upper pillar garnish | → | Quicking plate | → |
| (9) Number of fixed points | 3 | → | → | → | → | 2 | → | → | → |
| (10) Fixing span (mm) | 240 | → | → | → | → | 272 | → | 215 | → |
| (11) Geometrical moment of inertia at central part of fixing mm$^4$ | 178 | → | → | → | → | 115 | → | 78 | → |
| (Evaluation) | | | | | | | | | |
| (12) High temperature bulge (mm) | | | | | | | | | |
| 80° C. | 0.2 | 0.2 | 0.2 | 0.2 | 0.2 | 0.1 | 0.1 | 0.2 | 0.2 |
| 100° C. | 0.4 | 0.3 | 0.2 | 0.2 | 0.3 | 0.2 | 0.2 | 0.2 | 0.2 |
| 120° C. | 0.6 | 0.5 | 0.2 | 0.2 | 0.3 | 0.3 | 0.2 | 0.2 | 0.2 |
| (13) High temperature firm feeling (Kg) 80° C. | 1.50 | 1.60 | 1.70 | 1.75 | 1.70 | 1.5 | 1.6 | 2.1 | 2.3 |
| (14) Permanent deformation quantity after heat cycle 80° C., 10 cycles (mm) | 0.3 | 0.2 | 0.2 | 0.2 | 0.6 | 0.6 | 0.4 | 0.4 | 0.4 |
| (15) Properties of being injured injury conspicuousness | ⊚ | ⊚~o | o | o | o | ⊚ | ⊚ | ⊚ | ⊚ |
| (16) Pencil hardness | Bo | Bo | Bo | Bo | B~F | Bo | Fo | | |

As apparent from Table, the respective parts for autocars of Examples passed any of the above evaluation tests (i)~(iii).

(1) polymerizing propylene in a first stage so that the resulting propylene homopolymer has a relation between its isotactic pentad ratio (P) and MFR of $1.00 \geq P \geq 0.015 \log MFR + 0.955$ and amounts to 70 to 95% by weight of the block polymer, (2) thereafter polymerizing ethylene or ethylene and propylene in an amount of 30 to 5% by weight of the total polymerization quantity in at least one other stage, so as to give an ethylene content occupying 3 to 12% by weight of the block polymer, (3) blending 5 to 30% by weight of a filler into said block polymer, said interior parts having
- (a) a percentage opening of the cross section perpendicular to the direction of the major axis thereof of 20 to 48%;
- (b) two or more fixed points at a fixing patch of 300 mm or less; and
- (c) a geometrical moment of inertia in the cross section at the central part between the fixed points of at least 50 mm$^4$.

2. A method for preparing interior parts for autocars which comprises producing a propylene-ethylene block copolymer by (1) polymerizing propylene in a first stage so that the resulting propylene homopolymer has a relation between its isotactic pentad ratio (P) and MFR of $1.00 \geq P \geq 0.015 \log MFR + 0.955$ and amounts to 70 to 95% by weight of the block polymer, (2) thereafter polymerizing ethylene or ethylene and propylene in an amount of 30 to 5% by weight of the total polymerization quantity in at least one other stage, so as to give an ethylene content occupying 3 to 12% by weight of the block polymer, (3) blending 5 to 30% by weight of a filler into said block polymer, and molding said block copolymer to produce an interior part having
- (a) a percentage opening of the cross section perpendicular to the direction of the major axis thereof of 20 to 45%;
- (b) two or more fixed points at a fixing pitch of 300 mm or less; and (c) a geometrical moment of inertia in the cross section at the central part between the fixed points, of at least 50 mm$^4$.

* * * * *